May 9, 1961 J. L. ARENS ET AL 2,983,589
PROCESS FOR THE PURIFICATION OF CRYSTALS
Filed Sept. 24, 1956
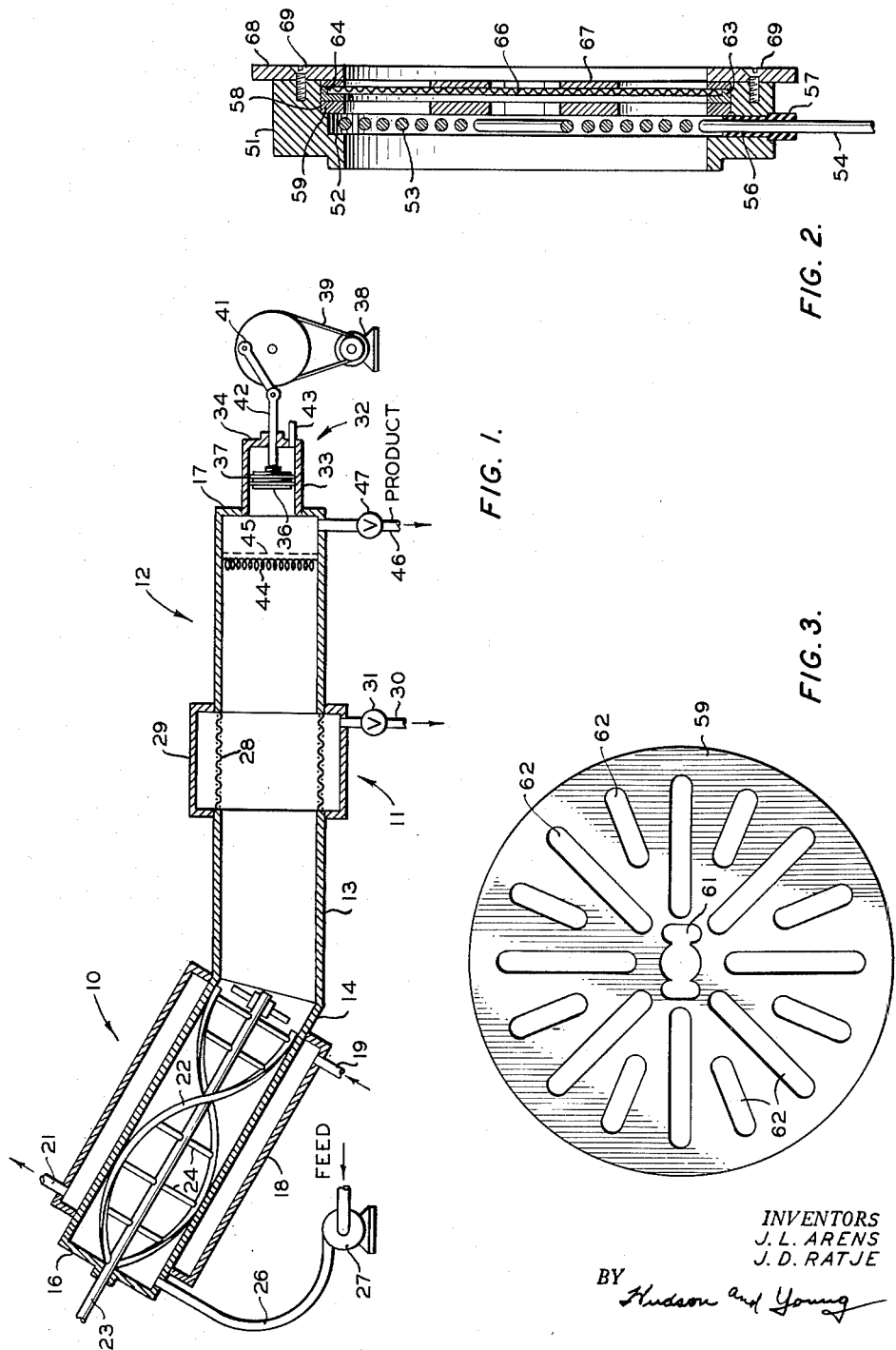
INVENTORS
J. L. ARENS
J. D. RATJE
BY Hudson and Young
ATTORNEYS United States Patent Office 2,983,589
Patented May 9, 1961

2,983,589

PROCESS FOR THE PURIFICATION OF CRYSTALS

James L. Arens and John D. Ratje, Borger, Tex., assignors to Phillips Petroleum Company, a corporation of Delaware Filed Sept. 24, 1956, Ser. No. 611,554

2 Claims. (Cl. 23—295)

This invention relates to the separation and purification of components of liquid multi-component mixtures. In one aspect, this invention relates to a process for the resolution of mixtures by crystallization. In another aspect, the invention relates to apparatus for the separation and purification of crystals.

Purification by means of fractional crystallization has been known for a number of years. Schmidt, Re. 23,810 (1954), discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

More recently, there has been proposed a process and apparatus for effecting a separation of the type described at higher throughput rates, improved stability and ease of operation, and improved heat distribution. In addition, products of high purity are obtainable over long periods of operation. In accordance with this invention, in a process wherein solids are countercurrently contacted with a reflux liquid in a purification zone, the solids in said zone are contacted with an intermittent flow of reflux liquid simultaneously with the propulsion of the solids through said zone. This invention is fully disclosed and claimed in copending U.S. patent application, Serial No. 494,866, filed March 17, 1955, now U.S. Patent 2,854,494 (1958), by R. W. Thomas, and the disclosure of this latter application is hereby incorporated by reference into the instant application. When employing the fractional crystallization apparatus described in the Thomas application, difficulties are sometimes encountered during the start-up operation, which result in a delay before the apparatus can be placed on stream. As discussed hereinafter, these difficulties are, in general, associated with the formation of the crystal bed within the purification column of the apparatus. In accordance with the instant invention, means are provided whereby the difficulties encountered during the start-up operation are eliminated so that the apparatus may be readily and rapidly placed on stream. While the invention is particularly applicable to use with the fractional crystallization apparatus described in the Thomas application, it is to be understood that the invention can also be employed with other types of apparatus, for example, apparatus similar to that disclosed in the above-cited Schmidt patent.

It is an object of the present invention to provide improved crystal purification apparatus.

Another object of the invention is to provide an improved process for the separation and purification of components of liquid multi-component mixtures.

Still another object of the invention is to provide a method for starting up fractional crystallization apparatus whereby the period of time required before the apparatus can be placed on stream is reduced to a minimum.

A further object of the invention is to provide a crystal purification apparatus which includes means whereby the crystal mass or bed is rapidly established in the purification zone during the start-up period.

Still other objects and advantages of the invention will become apparent to those skilled in the art upon reference to the accompanying disclosure.

The present invention resides in improved crystal purification apparatus and in a method for starting up such apparatus prior to being placed on stream. In accordance with one embodiment of the invention, there is provided, in an apparatus for the separation and purification of crystals comprising an elongated chamber, means for introducing crystals into one end portion of said chamber, heating means in the opposite end portion of said chamber, liquid withdrawing means connected to said opposite end portion, and at least one filter means in said chamber between said crystal introduction means and said heating means, the improvement which comprises means positioned adjacent said heating means for preventing the flow of crystals into the end of said chamber to which said liquid withdrawal means is connected. In accordance with another embodiment of the invention, there is provided, in an apparatus comprising a purification chamber, liquid-solid separation means in said chamber, liquid withdrawal means connected to said separation means, melting means positioned in one end of said chamber, means for moving solids into said separation means and thence toward said melting means, means for removing melt from said chamber and means for producing an intermittent fluid flow in a direction from said melting means toward said liquid-solid separation means, the improvement which comprises means positioned adjacent said melting means for preventing the flow of crystals into the end of said purification chamber containing said melting means.

In accordance with still another embodiment of the invention, there is provided, in a process for separating a component from a liquid multi-component mixture comprising cooling said mixture so as to form a slurry of crystals of said component in mother liquor, separating crystals from mother liquor and passing said crystals through a purification zone toward a melting zone, melting crystals in said melting zone, displacing a portion of the resulting melt from said melting zone into said moving crystals, and recovering a product from said melting zone, the improvement in starting up said process which comprises introducing said slurry of crystals into said purification zone and flowing same through said zone toward said melting zone, obstructing the flow of crystals in a portion of said purification zone adjacent said melting zone, thereby permitting a crystal bed to be formed in said purification zone upstream crystalwise from said melting zone, recovering mother liquor from said melting zone, and after formation of the crystal bed within said purification zone commencing the above-enumerated steps of said process.

The process and apparatus of this invention are applicable to a vast number of simple binary and complex multi-component systems. The invention is particularly applicable to the saparation of hydrocarbons which have practically the same boiling points and are, therefore, difficult to separate by distillation. Where high boiling organic compounds are concerned, separation by distillation is often undesirable because many such compounds are unstable at high temperatures. One particularly advantageous application of the process lies in the purification of a component of, for example, 15 to 25 per cent purity so as to effect a purity of 98 percent or higher. In order to illustrate some of the systems to which the invention is applicable, the following compounds are grouped with respect to their boiling points:

| Group A | B. P., °C. | F. P., °C. |
|---|---|---|
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimethylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B. P., °C. | F. P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B. P., °C. | F. P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B. P., °C. | F. P., °C. |
|---|---|---|
| Aniline | 184.4 | −6.2 |
| Toluene | 110.8 | −95 |
| Benzene | 80.0 | 5.5 |

| Group E | B. P., °C. | F. P., °C. |
|---|---|---|
| Carbon Tetrachloride | 77 | −22.8 |
| Chloroform | 61 | −63.5 |
| CS₂ | 46.3 | −108.6 |
| Acetone | 56.5 | −95 |

| Group F | B. P., °C. | F. P., °C. |
|---|---|---|
| Ortho-xylene | 144 | −27.1 |
| Meta-xylene | 138.8 | −47.4 |
| Para-xylene | 138.5 | 13.2 |

| Group G | B. P., °C. | F. P., °C. |
|---|---|---|
| Ortho-cymene | 175.0 | −73.5 |
| Meta-cymene | 175.7 | <−25 |
| Para-cymene | 176.0 | −73.5 |

| Group H | B. P., °C. | M. P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B. P., °C. | M. P., °C. |
|---|---|---|
| Ortho-nitrotoluene | 222.3 | α−10.6, β−4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple apple, tomato, etc. It is also possible to concentrate vegetable juices and beverages such as milk, beer, wine, coffee or tea by this method.

A clearer understanding of the invention can be obtained by referring to the following disclosure and the drawing, in which:

Figure 1 is an elevational view, partly in section, illustrating a preferred embodiment of the invention;

Figure 2 is an elevational view in section, which illustrates a preferred arrangement of the heating means and crystal obstruction means of this invention; and Figure 3 is a plan view of the backup plates shown in Figure 2.

Referring now to Figure 1 of the drawing, there is illustrated fractional crystallization apparatus which includes the crystal obstruction means of this invention. As shown, the apparatus comprises freezing or crystallizing means 10, a filtering means 11, and a purification section 12. The purification apparatus is composed of a cylindrical shell 13 to which is attached the freezing section comprising a cylindrical shell 14. Shells 13 and 14 can be constructed of ordinary metal pipe welded together at any desired angle, as indicated in the drawing. Alternatively, they can be a single length of pipe which can be built in the form of an elbow at any desired angle. The particular angle shown in the drawing can vary within a very broad range, or the entire apparatus can be straight. End members 16 and 17 provide means for closing the ends of the purification apparatus.

Crystallization section 10 comprises, in addition to shell 14, a cooling jacket 18 having an inlet 19 and an outlet 21 attached thereto. Positioned within the crystallization section is an agitator or scraping means 22, which is designed to prevent the accumulation of solid material on the heat exchange surface. Scrapers 22 are suitably constructed of strips of metal or other suitable materials known in the art. They can be fabricated in the form of a helix, as illustrated in the drawing, or they can be straight. The scrapers which can be provided in any suitable number are mounted on a rotatable shaft 23 by means of members 24. Shaft 23, which is axially positioned in shell 14, is connected to any suitable source of power for rotation of the scrapers, such power source not being shown in the drawing. The rotatable shaft is suitably sealed in end member 16 by means of a packing gland of any desired type known in the art. It is to be understood that it is not intended to limit the invention to any particular crystallization means, for any suitable crystallizer can be used in the practice of this invention. Feed mixture is pumped into the crystallization section through inlet conduit 26 by means of pump 27 which is provided in this conduit. Suitable cooling of the feed which enters shell 14 through inlet conduit 26 can be provided by adding a coolant through inlet 19 and withdrawing the coolant through outlet 21. Sufficient cooling in the crystallization section is provided so that a predetermined amount of solid crystals is produced.

As a general rule, feed pump 27 is suitable for forcing the crystal mixture formed in the crystallizer through the purification column. However, other means for moving the mixture through the apparatus can be provided, e.g., means such as that shown in the cited Schmidt reissue patent. Where such means, for example, a piston, is provided, it can be positioned upstream from the crystallization section or intermediate this section and filtering means 11.

Filtration means 11 comprises a suitable filter medium 28 and an external shell or jacket 29. The external shell is provided wtih an outlet means 30 containing a flow control means 31 for removal of liquid from the purification apparatus. Filter medium 28 can be of any desired type known in the art. For example, it can comprise a metallic screen, a sintered perforate metal member or a perforate metal member supporting a filter cloth. In any event, it is desirable that the filter medium be positioned integrally with respect to shell 13.

Attached to the downstream end crystalwise of the purification apparatus is pulsation-producing member 32. This member comprises a cylinder 33 which is suitably attached to closure member 17 as, for example, by welding, and closure means 34, together with a reciprocable piston 36. Piston 36 is suitably sealed in cylinder 33, for example, by means of rings 37, to prevent leakage of liquid from the purification zone. As illustrated, reciprocation of piston 36 is produced by an electrical motor 38, a belt 39, a crank means 41, and connecting rods 42, which can be sealed in closure member 34 by means of a packing gland. An outlet 43 is provided in closure member 34 to facilitate reciprocation of piston 36 and can be connected to means, not shown, for recovery of any material which might escape from the purification column in case of failure of rings 37.

A melting zone is maintained in the downstream end crystalwise of the purification apparatus by means of a heating means 44. The heating means is preferably in the form of an electrical heating coil around which liquid may pass during conduct of the process. However, it is within the purview of the invention to employ other suitable heating means, for example, a heat exchange coil through which a suitably heated fluid is passed. Positioned adjacent heating means 44 is crystal obstructing means 45 which acts as a crystal barrier to prevent crystals from passing into the end of the column to which product outlet means 46 is attached. Product outlet means 46 has a flow control means 47 positioned therein. The crystal obstructing means is preferably a screen covering the entire cross section of the column and having a mesh size small enough to prevent crystals from passing therethrough while permitting free flow of liquid. However, it is not intended to limit the invention to the use of a screen, for other suitable means can be employed, for example, a perforated plate member, to prevent the flow of crystals into the end of the purification column. Although the crystal barrier is shown as being disposed downstream crystalwise from the heating means, it is within the scope of the invention to position the barrier upstream from the heating means. However, it has been found that in most cases more satisfactory operation is obtained when the crystal obstructing means is disposed as shown in the drawing. This is believed to be due to the fact that better melting of the crystals is obtained during conduct of the process when the portion of the purification zone upstream crystalwise from the heating means is unobstructed so that crystals can come, if necessary, into contact with the heating means.

Although the purification column is shown as being positioned horizontally, it is to be understood that it can be operated in other positions. For example, it can be maintained in a vertical position with pulsation-producing member 32 being at the top.

Figure 2 of the drawing illustrates in detail an arrangement of a heating means-crystal barrier assembly, which has been found to be particularly useful in the practice of this invention. However, it is to be understood that other arrangements of the elements can be resorted to which come within the purview of the invention. As shown in Figure 2, heater ring 51 is provided with a recessed portion 52 within which heating coil 53 is positioned. One end 54 of the heating coil passes through an opening or hole 56 formed in the side of the heater ring. The other end of the heating coil is not shown in Figure 2, but it also passes through an opening similar to opening 56 in the heater ring. A suitable bushing or seal 57 is provided in each of holes 56 to prevent leakage of liquid from the purification apparatus. The ends of the heating coil are connected to a suitable source of power, which is not shown in the drawing. Heater ring 51 is also provided with a second recessed portion 58, somewhat larger in diameter than recessed portion 52, in which backup plate 59 is disposed. The backup plate is shown in detail in Figure 3, and it will be noted that this plate is perforated by having formed therein a central opening 61 and a plurality of radial slots 62. The backup plate serves as a support for the heating coil while allowing liquid to pass therethrough.

Referring again to Figure 2, a spacer ring 63, which is positioned next to the backup plate in the second recessed portion of heater ring 51, is provided with a recessed portion 64 in which screen 66 is positioned. A 24 x 110 mesh Dutch-weave screen has been found to be particularly useful in the practice of the invention; however, any screen having a mesh size suitable for preventing the passage of crystals therethrough can be employed. It has also been found to be advantageous in some cases in order to provide additional support to use a pair of screens, one of which is a fine screen supported on a coarse screen of 16 x 16 or 18 x 18 mesh. Screen 66 is held in place and supported by means of a second backup plate 67 also disposed in the second recessed portion of heater ring 51. This second backup plate is provided with openings similar to those in backup plate 59 so that when the openings in the two plates coincide continuous passageways for liquids are provided through the assembly. Heating coil 53, backup plate 59, spacer ring 63, screen 66 and backup plate 67 are all held in position within the recessed portions of the heater ring by means of retaining ring 68, which is attached to the heater ring by means of screws 69. From the above description, it is seen that a heater-crystal barrier assembly is provided which is very compact and well adapted for use in the practice of this invention.

When practicing a fractional crystallization process as described herein, the crystals formed upon cooling of the feed mixture are moved or passed through the purification zone as a crystal mass or bed. On approaching or coming into contact with the heating means, the crystals are melted and a portion of the resulting melt is passed as reflux countercurrent to crystal movement and in intimate contact therewith to displace occluded impurities. The high purity of product obtainable is believed to be due at least in part to the action of the reflux stream in contacting the crystals. In order for the crystal purification apparatus to be in condition to produce high purity product, it is necessary that a crystal bed be established in the purification zone upstream crystalwise from the heating means. Furthermore, in order to effect a high degree of purification, it is important that all of the crystals be contacted with the reflux stream prior to entering the melting zone maintained by the heating means. Accordingly, the crystal bed so formed must be such that channeling of reflux liquid therethrough does not occur. The instant invention is related to a means and method whereby a crystal bed is readily and rapidly established in the purification zone above the heating means during the start-up period.

Referring to Figure 1 of the drawing, during the start-up period, a feed mixture comprising two or more components, one of which is separable from the mixture by crystallization, enters the purification apparatus through inlet line 26 and is forced by means of pump 27 into crystallizing means 10. Sufficient cooling is provided in the crystallizer by circulating a coolant through jacket 18 so that a predetermined amount of solid crystals are formed. As a general rule, the solids content of the mixture fed from the crystallizer into the purification column is within the range of 20 to 60 weight percent, and preferably 35 to 45 weight percent. However, solids content outside the stated ranges can be used. During this period of the operation, valve 31 contained in filter outlet line 30 remains closed while the valve 47 in the product outlet line 46 is in an open position. It is to be understood also that during this period, piston 36 is stationary and heating means 44 is not supplying heat to the column. The crystal slurry formed in crystallizing means 10 passes into purification column 13 and thence through filter 29 and into purification section 12 of the column. Because of the placement of crystal barrier 45 adjacent heating means 44, movement of crystals into the end of the column containing product outlet line 46 is prevented. However, mother liquor does pass through the crystal barrier and is thereafter removed from the column through product outlet line 46. It is seen, therefore, that crystal barrier 45 in effect acts as a filter during the start-up period. The column is operated in this manner with the filter outlet line closed and the product outlet line open until such time as a crystal bed is established in purification section 12 upstream crystalwise from the heating means.

Prior to the use of the crystal barrier of this invention with the crystallization apparatus described herein, difficulty was encountered in some cases in readily establishing a crystal bed within the purification column. While it was possible in all instances to establish the crystal bed, the result was often a prolonged start-up period before the apparatus could be placed on stream. The difficulty in establishing a crystal bed appears to have been due primarily to the formation of a crystal plug in the product outlet line. In cases where a crystal plug was so formed, the crystal bed often extended from the end of the column downstream crystalwise from the heating means to a point upstream crystalwise from the heating means. Thus, it is seen that the crystal bed actually surrounded the heating means, and only after the portion of the crystal bed downstream from the heating means was melted was a satisfactory crystal bed formed in the purification column. In some cases, the crystal bed upstream crystalwise from the heating means melted out first upon turning on the heating means so that it became necessary to repeat the operation. The situation prevailing when the crystal mass upstream from the heating means melts out first is a channel-type upset which is impossible to eliminate when hampered by restricted product flow. Use of the crystal barrier of this invention has resulted in being able to form crystal beds at the desired position while allowing mother liquor to flow unrestricted from the product end of the purification column. Furthermore, it has been possible to lessen channel-type upsets during start-up by being able to form a dense bed in the proper location before application of pulsating pressure on the reflux melt. If a column upset should occur, it has also been found that the crystal barrier assists in the recovery operation by decreasing the time required to rebuild the crystal bed. The crystal barrier of this invention is particularly applicable to the crystal purification apparatus described herein. However, the invention is also applicable to crystal purification apparatus such as that described in the Schmidt reissue patent. Furthermore, while the crystal barrier finds its most important application during the start-up period, the barrier also operates during the actual conduct of the process to prevent crystals which may not be melted by the heating means from passing into and plugging the product outlet line.

After establishment of the crystal bed as described hereinabove, valve 31 in filter outlet line 30 is opened and the heating means is turned on so as to provide a melting zone in the end of the column. As a result of opening the valve in the filter outlet line, mother liquor is separated from the slurry entering the filter section. The resulting crystal mass passes through the filter section and thence into purification section 12 wherein it is countercurrently contacted with liquid reflux produced as subsequently described.

As the crystal bed approaches heating means 44, the crystals are melted. Part of the resulting melt is withdrawn through outlet line 46 as a purified product of the process while the remainder of the melt is forced back through purification zone 12 as reflux which effects the desired crystal purification. It is believed that the reflux stream refreezes upon the crystals moving toward the heating means, thereby displacing occluded impurities from the crystals. A stream comprising displaced impurities is thereafter removed from the purification zone through filter outlet line 31 along with mother liquor.

While the crystal mass is being advanced through purification section 12 and into the melting zone maintained by heating means 44, piston 36 is reciprocated at a suitable rate so that a pulsating pressure is exerted on the melt reflux which is intermittently forced back, countercurrently with respect to crystal movement, through the purification section. Certain ranges of frequency of pulsation of the back pressure applied have been found to produce results superior to certain other ranges of frequency. In the separation of para-xylene from its isomers, for example, improved results are obtainable at a frequency as low as 15 pulsations per minute or as high as 210 pulsations per minute. However, outstanding results are obtained at from 50 to 210 pulsations per minute and highly superior results are obtained in the range from 125 to 150 pulsations per minute. It has been found that within the preferred range, the operation of the purification column is greatly stabilized and the movement of material therethrough is greatly facilitated. Thus, the attainment and maintenance of phase equilibrium, as indicated by temperature gradients within the column, is greatly facilitated by the use of pulsating back pressures and reflux flow according to this invention. As regards production of a high purity product consistently over an extended period of time, a critical lower limit of frequency exists at about 50 pulsations per minute in the purification of para-xylene. Broadly, however, the invention is not so limited. For a more detailed description of crystal purification apparatus to which this invention is particularly applicable and the method of operation, reference may be had to the cited Thomas application. Copending U.S. patent application Serial No. 514,499, filed June 10, 1955, now Patent No. 2,919,991, by J. D. Ratje, may also be referred to for a method and system for controlling the operation of the purification apparatus.

A more complete understanding of the invention may be obtained by referring to the following illustrated example which is not intended, however, to be unduly limitative of the invention.

Example

Crystal purification apparatus similar to that illustrated in Figure 1 is used in the purification of para-xylene. A feed material comprising 60.0 weight percent para-xylene, the impurities being chiefly ortho- and meta-xylenes and ethyl benzene, is pumped into the crystallizer wherein it is cooled to a temperature of about 4° F. The resulting crystal slurry containing about 27.5 weight percent solids is passed from the crystallizer into the crystal purification column.

During the start-up period, the valve contained in the filter outlet line is closed with the valve in the product outlet line being open. Also, the heater is turned off at this time, and the pulse piston is not operating. The crystals are retained on the screen positioned adjacent the heater while the mother liquor passes through the screen into the end of the column from which it is withdrawn through the product outlet line. In this manner, a crystal bed is formed in the crystal purification column upstream crystalwise from the heater.

When the crystal bed extends upstream crystalwise from the screen to 6 inches upstream of the filter, the heater is turned on and the operation of the pulse piston is commenced. The pressure control in the filter outlet line is adjusted at this time so that filtrate can be removed from the column. The product flow control is adjusted so as to maintain a temperature between about 67 and 73° F. in the column. The pulse piston is operated at 140 cycles per minute. Filtrate is withdrawn from the column through the filter outlet line at the rate of about 39.5 g.p.h. while product is recovered through the product outlet line at the rate of about 15.0 g.p.h. The filtrate contains about 45 weight percent para-xylene while the product contains about 98.8 weight percent para-xylene.

From the foregoing, it will be seen that we have providing a means and method whereby a crystal bed can be easily and rapidly formed in the purification column of fractional crystallization apparatus. Variations and modifications of the invention will become apparent to those skilled in the art upon consideration of the foregoing disclosure. Such variations and modifications are believed to come within the spirit and scope of the invention.

We claim:

1. In a process which comprises passing a slurry of crystals in mother liquor into a filter zone, withdrawing mother liquor from said filter zone; moving the resulting crystal mass into a purification zone, moving said crystal mass through said purification zone into a melting zone, melting crystals in said melting zone, passing a portion of the resulting melt countercurrently to the direction of movement of crystals in said purification zone, and recovering a product from said melting zone, the improvement in starting up said process which comprises introducing said slurry of crystals in mother liquor into said filter zone; flowing said slurry through said filter zone and said purification zone toward said melting zone; obstructing the flow of crystals in a portion of said purification zone adjacent said melting zone while allowing mother liquor to flow htrough said portion of said purification zone, thereby forming a crystal bed in said purification zone upstream crystalwise from said melting zone; recovering mother liquor from said melting zone; and after formation of said crystal bed within said purification zone effecting the above-enumerated steps of said process.

2. A process for separating a component from a liquid multicomponent mixture which comprises introducing said mixture into a cooling zone; cooling said mixture in said cooling zone so as to crystallize at least a portion of one of the components of said mixture; passing the resulting slurry of crystals in mother liquor into and through a filtering zone and thence into a purification zone; flowing said slurry through said purification zone toward a melting zone; obstructing the flow of crystals in a portion of said purification zone adjacent said melting zone while allowing mother liquor to flow through said portion of said purification zone, thereby forming a crystal bed in said purification zone adjacent said melting zone; recovering mother liquor from said melting zone; after formation of said crystal bed in said purification zone, withdrawing mother liquor from said filtering zone; passing the resulting crystal mass from said filtering zone through said purification zone toward said melting zone; melting crystals in said melting zone; withdrawing a portion of the resulting melt from said melting zone as a product of the process; passing the remainder of the melt into said purification zone in a direct countercurrent to the movement of crystals therethrough; and applying a pulsating pressure to the melt in said melting zone.

References Cited in the file of this patent

UNITED STATES PATENTS

| Number | Name | Date |
|---|---|---|
| 231,058 | Latham | Aug. 10, 1880 |
| 315,120 | Bruce | Apr. 7, 1885 |
| 1,893,330 | Jones | Jan. 3, 1933 |
| 2,727,632 | Mack | Dec. 20, 1955 |
| 2,747,001 | Weedman | May 22, 1956 |
| 2,765,921 | Green | Oct. 9, 1956 |
| 2,854,494 | Thomas | Sept. 30, 1958 |